United States Patent [19]

Dillmann

[11] Patent Number: 5,158,742

[45] Date of Patent: Oct. 27, 1992

[54] REACTOR STEAM ISOLATION COOLING SYSTEM

[75] Inventor: Charles W. Dillmann, Morgan Hill, Calif.

[73] Assignee: General Electric Company, San Jose, Calif.

[21] Appl. No.: 805,132

[22] Filed: Dec. 11, 1991

[51] Int. Cl.$^5$ ............................................. G21C 15/18
[52] U.S. Cl. .................................... 376/299; 376/367; 165/81; 165/911; 165/104.14
[58] Field of Search ............... 376/283, 298, 299, 367; 165/104.14, 81, 911

[56] References Cited

U.S. PATENT DOCUMENTS

| | | | |
|---|---|---|---|
| 4,050,983 | 9/1977 | Kleimola | 376/367 |
| 4,948,554 | 8/1990 | Gou et al. | 376/283 |
| 5,008,069 | 4/1991 | Fredell | 376/299 |
| 5,076,999 | 12/1991 | Forsberg | 376/299 |

FOREIGN PATENT DOCUMENTS 1210907  3/1960  France ........................... 165/104.14

OTHER PUBLICATIONS

H. N. Franklin, "Building a Better Heat Pipe", Aug. 1990, *Mechanical Engineering*, pp. 52–54.
B. R. Babin et al., "Experimental Investigation of a Flexible Bellows Heat Pipe for Cooling Discrete Heat Sources", Aug. 1990, *Journal of Heat Transfer*, pp. 602–607.
Tubular Exchanger Manufacturers Assc. (TEMA), "Standards of Tubular Exchangers Association", 1978, pp.: cover, dedication, 3–6, and 102–106.
GE Nuclear Energy, "SBWR Technical Description for NRC Staff Presentation", Dec. 1989, pp.: cover; 1.0–1;1.2–16,17,19,20 & 28; 2.3–1 thru 11, 15–18; 2.6–14 & 42.

*Primary Examiner*—Daniel D. Wasil
*Attorney, Agent, or Firm*—Robert R. Schroeder

[57] ABSTRACT

A reactor steam isolation cooling system includes a containment building surrounding a reactor pressure vessel having a reactor core for generating reactor steam. An isolation pool is disposed outside the containment building and is vented to the atmosphere. An isolation condenser includes a plurality of heat pipes collectively defining at one end thereof a condenser assembly disposed outside the containment building and inside the isolation pool, and at an opposite end thereof an evaporator assembly extending inside the containment building. Reactor steam is selectively channeled to the evaporator assembly for heating a working liquid therein and condensing the reactor steam to form reactor condensate for return to the pressure vessel. The working liquid is vaporized in the evaporator assembly and flows to the condenser assembly wherein it releases heat into the isolation pool with the working condensate therefrom returning to the evaporator assembly.

10 Claims, 4 Drawing Sheets

REACTOR STEAM ISOLATION COOLING SYSTEM

TECHNICAL FIELD

The present invention relates generally to nuclear reactor plants, and, more specifically, to isolation cooling of a nuclear reactor therein.

BACKGROUND ART

In a conventional nuclear reactor plant, a nuclear reactor such as a boiling water reactor (BWR) is submerged in reactor water within a pressure vessel, and the pressure vessel is disposed inside a containment building. During operation, the reactor core boils the reactor water to generate reactor steam which is suitably channeled to a steam turbine, for example, for generating electrical power. The pressure vessel is suitably sized and configured for containing the relatively high pressures of the reactor steam which may be about 70 kg/cm$^2$ for example. The containment building, in turn, is sized and configured for also containing such relatively high reactor steam pressures in the event of failure of the pressure vessel or the reactor steam lines therefrom. The containment building also is effective as a radioactive shield for containing radioactivity therein. The building is typically made of thick concrete and is metal lined.

In one type of failure mode of the reactor plant, the reactor may become isolated from its normal cooling and water makeup systems, and a conventional isolation condenser is provided to cool the reactor in such event. In another failure mode, a pressure boundary failure such as the failure of one of the reactor steam pipes within the containment building may release hot steam under reactor pressure inside the containment building, and the isolation condenser may also be used to cool that released steam. In either occurrence, as the reactor core is shut down, decay heat is generated which in turn continues to generate reactor steam which must be quenched and cooled to prevent unacceptable temperature and pressure rises within the pressure vessel and/or the containment building.

The isolation condenser is typically a conventional heat exchanger having a plurality of tubes therein which are disposed within an isolation pool of water outside the containment building, and the reactor steam from the pressure vessel or from within the containment building is suitably channeled to the isolation condenser and between its tubes for cooling the steam and transferring the heat thereof to the isolation pool water. The reactor steam is condensed on the tubes and is conventionally drained back to the pressure vessel and reused to carry more heat away from the reactor core.

In order for the isolation condenser to be effective for maximizing heat transfer from the reactor steam to the pool water, the tubes must be relatively thin and single walled, but, they must be also strong enough to contain the relatively high pressure of the reactor steam being channeled therethrough. Since the reactor steam is channeled through the containment building and through the condenser tubes disposed outside thereof, the tubes themselves provide only a single barrier against release of the reactor steam, which is radioactive. If one or more of the condenser tubes fails during operation, the reactor steam will leak into the isolation pool and be released through a conventional vent to the atmosphere, which therefore would release radiation to the atmosphere outside the containment building.

In order to reduce the risk of radioactive steam release from the condenser in the event of a failure thereof, conventional isolation valves are provided both in the conduits leading from the pressure vessel or containment building to the isolation condenser and in the conduits returning the condensed steam back to the pressure vessel. The isolation valves are normally closed valves which must be energized to open during operation so that, upon any failure of the isolation condenser which might release steam therefrom, the fail-safe condition will allow the valves to close upon interruption of power thereto which will stop the flow of reactor steam to the isolation condenser and, therefore, prevent any further release of radiation to the atmosphere.

Accordingly, this exemplary conventional isolation condenser system provides a single barrier against release of radioactive steam and is an active system in part since power must be provided to the isolation valves to keep them open during operation while allowing the fail-safe closure thereof in the event of interruption of power thereto to reduce the risk of inadvertent release of radiation in the event of isolation condenser tube failure.

OBJECTS OF THE INVENTION

Accordingly, one object of the present invention is to provide a new and improved reactor steam isolation cooling system.

Another object of the present invention is to provide an isolation cooling system having redundant barriers against leakage of radioactive steam.

Another object of the present invention is to provide a passive isolation cooling system having a normally open shutoff valve for allowing passive operation upon loss of power thereto.

DISCLOSURE OF INVENTION

A reactor steam isolation cooling system includes a containment building surrounding a reactor pressure vessel having a reactor core for generating reactor steam. An isolation pool is disposed outside the containment building and is vented to the atmosphere. An isolation condenser includes a plurality of heat pipes collectively defining at one end thereof a condenser assembly disposed outside the containment building and inside the isolation pool, and at an opposite end thereof an evaporator assembly extending inside the containment building. Reactor steam is selectively channeled to the evaporator assembly for heating a working liquid therein and condensing the reactor steam to form reactor condensate for return to the pressure vessel. The working liquid is vaporized in the evaporator assembly and flows to the condenser assembly wherein it releases heat into the isolation pool with the working condensate therefrom returning to the evaporator assembly.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
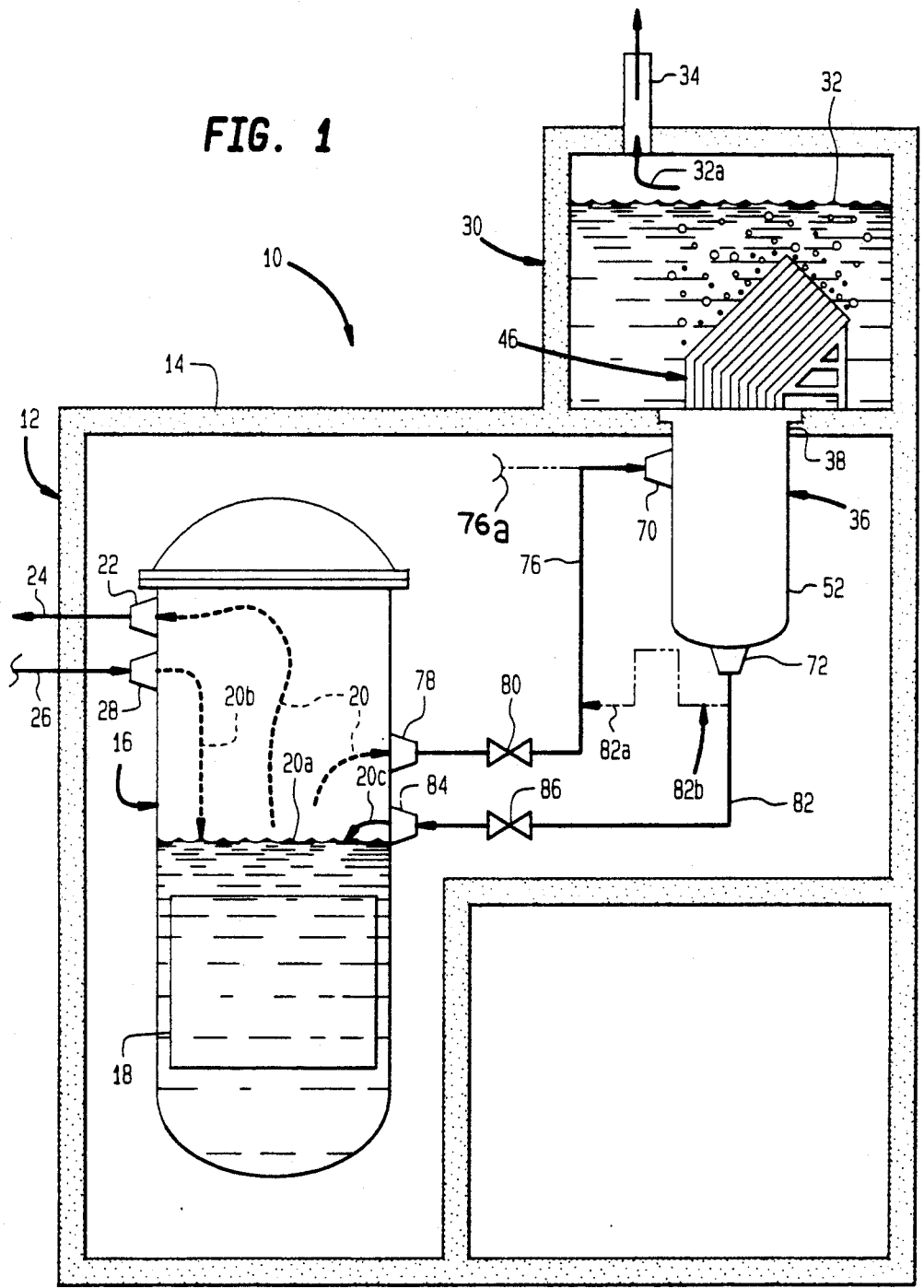
FIG. 1 is a schematic, elevation view of a reactor steam isolation cooling system in accordance with the present invention.

Illustrated schematically in FIG. 1 is a portion of a nuclear reactor power plant having a reactor steam isolation cooling system designated 10 in accordance with an exemplary embodiment of the present invention. The cooling system 10 includes a containment building 12 having a plurality of walls including a top containment wall 14 which may be conventionally formed of concrete with a metal or steel inner liner. A conventional reactor pressure vessel 16 is disposed inside the containment building 12 and includes a conventional nuclear reactor core 18 in an exemplary form of a boiling water reactor (BWR) which is operable for generating reactor steam 20 from water 20a contained therein.

During normal operation, the reactor core 18 boils the water 20a by heat released from nuclear fission for generating the reactor steam 20. Conventional steam separators and steam dryers (not shown) remove moisture from the reactor steam 20, and then the steam 20 is conventionally discharged from the pressure vessel 16 through a conventional main steam outlet 22 and through a conventional main steam outlet conduit 24 which extends through the containment building 12. The reactor steam 20 is channeled for example to a conventional steam turbine (not shown) for generating electrical power from a generator joined thereto. Water, in the form of feedwater 20b is returned to the pressure vessel 16 through a conventional feedwater conduit 26 through the containment building 12 to a feedwater inlet 28 of the pressure vessel 16. A conventional feedwater sparger (not shown) distributes the feedwater 20b inside the pressure vessel 12 wherein it mixes with the reactor water 20a therein.

In the event of isolation of the reactor core 18, which may occur upon tripping of the steam turbine for example, the reactor core 18 is conventionally shut down, with the reactor core 18 still providing decay heat which continues to boil the reactor water 20a to generate the reactor steam 20 for a certain time period. Or, in an alternate situation, the reactor steam 20 may be released inside the containment building 12 by failure of the outlet conduit 24 for example which increases the temperature and pressure therein. The reactor steam 20 generated within the pressure vessel 16 is at an elevated temperature of about 290° C. and at an elevated pressure of about 70 kg/cm$^2$, for example, which upon release inside the containment building 12 can damage conventional components therein.

Accordingly, the isolation cooling system 10 in accordance with the present invention is effective for passively cooling the reactor steam 20 in the event of isolation of the reactor core 18 or in the event of release of the steam 20 inside the containment building 12.

In a preferred embodiment, the isolation system 10 further includes an isolation pool 30 disposed outside the containment building 12 and adjacent to the containment wall 14 above the pressure vessel 16. The isolation pool 30 contains pool water 32 which is used as a heat sink for dissipating the heat from the reactor steam 20. The isolation pool 30 also includes a vent 34 extending through a wall thereof and disposed in flow communication between the pool water 32 and the atmosphere outside the containment building 12 which is at atmospheric pressure. The vent 34 allows vapor 32a from the pool water 32 to be discharged from the pool 30 into the atmosphere for releasing heat therein.

An isolation condenser 36 in accordance with one embodiment of the present invention extends sealingly through a transfer port 38 in the upper wall 14 between the pool 30 and the containment building 12. The isolation condenser 36 is illustrated in more particularity in FIG. 2 and includes a plurality of parallel, closed, conventional heat pipes 40 each containing a will not contaminate the reactor steam 20 in the event of leakage from the heat pipes 40. Each heat pipe 40 includes a first or hot tube 44 integrally joined with a second or a cold tube 46. The hot tubes 44 are preferably disposed vertically upright inside the containment building 12 and extend downwardly from the upper wall 14, and the cold tubes 46 extend upwardly from the hot tubes 44 inside the isolation pool 30 and are primarily inclined inside the isolation pool 30 at an angle A of about 45°, for example, in the preferred embodiment.

The hot tubes 44 collectively define an evaporator assembly for heating and boiling the working liquid 42 to form a working vapor 42a which rises naturally upwardly through the hot tubes 44 and into the cold tubes 46. The cold tubes 46 collectively define a condenser assembly disposed under the pool water 32 which are cooled thereby for cooling the working vapor 42a therein to form a working liquid condensate 42b which is returned by gravity, for example, from the cold tubes 46 and into the hot tubes 44 for mixing with the original working fluid 42.

The hot tubes 44 are so characterized since the hot reactor steam 20 is suitably selectively channeled therebetween from either the pressure vessel 12 in the event of the isolation occurrence, or from within the containment building 12 in the event of steam release therein. The hot reactor steam 20 heats the working fluid 42 in the hot tubes 44 for removing heat from the reactor steam 20 to form a reactor liquid or condensate 20c which is suitably returned to the pressure vessel 16. The cold tubes 46 are so characterized since they are relatively colder than the hot tubes 44 during operation and are disposed in the relatively cold pool water 32 for cooling the working vapor 42a to form the working condensate 42b, thereby releasing heat into the pool water 32. The heat pipes 40 utilize the heat absorption and release from the change of phase from liquid to vapor and back to liquid for removing heat from the reactor steam 20 and releasing that heat into the pool water 32 for removal from the containment building 12.

Although the isolation condenser 36 could be disposed solely outside the containment building 12 or solely within the containment building 12, in the preferred embodiment it is disposed through the upper wall 14 for several reasons. Most importantly, in order to provide an additional or redundant barrier against leakage of the radioactive reactor steam 20 through the walls of the containment building 12, the hot tubes 44 extend downwardly from the upper wall 14 inside the containment building 12 to provide a first barrier, and the radioactive reactor steam 20 is contained solely inside the containment building 12. The cold tubes 46 provide a second or redundant barrier against leakage of the radioactive steam from the containment building 12. The heat pipes 40 themselves therefore provide redundant barriers against leakage of the reactor steam 20 from the containment building 12. In a conventional isolation condenser, for comparison, a conventional heat exchanger or condenser is disposed inside an isolation pool with the reactor steam 20 being channeled inside the tubes forming the heat exchanger. Failure of any of the heat exchanger tubes which leaks the radioactive steam 20 into the isolation pool will therefore release radioactivity through the vent thereof into the atmosphere. However, by utilizing the heat pipes 40, the hot tubes 44 provide the first barrier against leakage of the radioactive reactor steam 20 and, upon any failure of the hot tubes 44, the reactor steam 20 would merely flow inside such failed hot tube 44 and upwardly into the corresponding cold tube 46 which provides the second barrier to prevent its release into the isolation pool 30 and through the vent 34 to the atmosphere.

However, since the isolation condenser 36 must itself breach the upper containment wall 14 it is sealingly joined thereto to accommodate pressures within the containment building 12 which may be up to the pressures within the pressure vessel 16 during a steam release condition.

More specifically, the isolation condenser 36 preferably includes an annular tube sheet 48 disposed between the hot and cold tubes 44 and 46 which has a suitable thickness T for accommodating any expected pressure loads from the reactor steam 20 channeled between the hot tubes 44. The tube sheet 48 includes a plurality of apertures 50 through which the heat pipes 40 are disposed in sealing contact therewith for preventing leakage of the reactor steam 20 into the reactor pool 30.

Figure 3:
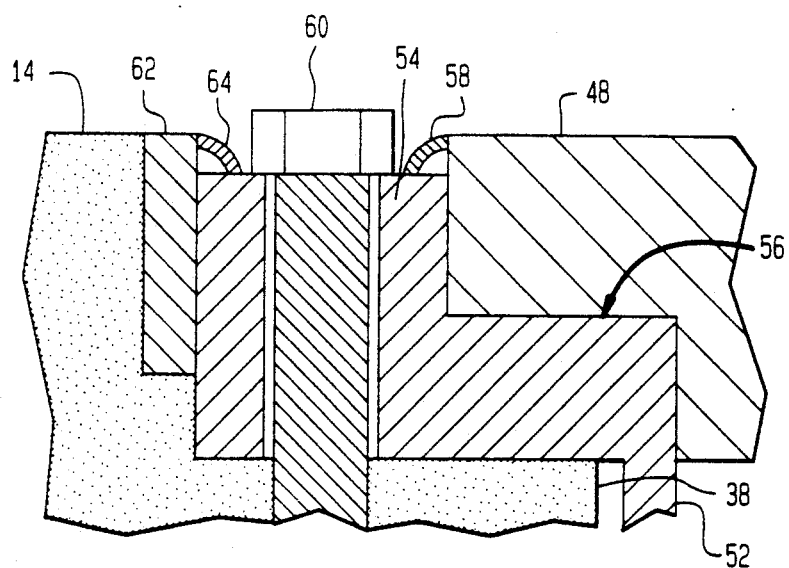
FIG. 3 is an enlarged sectional view of a portion of the isolation condenser illustrated in FIG. 1 within the dashed circle labeled 3 showing the condenser sealingly joined to a containment wall.

In a preferred embodiment, the isolation condenser 36 further includes a cylindrical shell 52 surrounding the evaporator assembly of the hot tubes 44 disposed inside the containment building 12 which is sealingly joined to the tube sheet 48. More specifically, the shell 52 includes an annular shell flange 54 at the base thereof which is conventionally fixedly joined to the tube sheet 48 by welding for example. As shown in more particularity in FIG. 3, the tube sheet 48 and shell flange 54 are joined together at a complementary lap joint 56 and a conventional first annular canopy seal 58 is welded to both the tube sheet 48 and the shell flange 54 on the isolation pool side thereof to prevent leakage of the pool water 32 downwardly through the lap joint 56. The first canopy seal 58 also prevents leakage of the reactor steam 20 from within the shell 52 and into the isolation pool 30. The isolation condenser 36 is fixedly joined to the upper containment wall 14 by a plurality of circumferentially spaced apart bolts 60 which extend through respective apertures in the shell flange 54 and are conventionally joined to the upper containment wall 14.

The upper wall 14 preferably includes an annular metal ring 62 conventionally formed or cast with the concrete upper wall 14, and a second annular canopy seal 64 is conventionally welded to the ring 62 and the shell flange 54 on the pool side thereof for preventing leakage of the pool water 32 therebetween. The bolts 60 are also conventionally sealed with suitable gaskets for also preventing leakage of the pool water 32 into the containment building 12. It is preferred that the canopy seals 58 and 64 are disposed on the top of the shell flange 54 where they are readily accessible and may be examined during maintenance operations. Furthermore, they prevent pool water 32 from corroding the respective joints between the shell flange 54 and the tube sheet 48 and ring 62.

Figure 2:
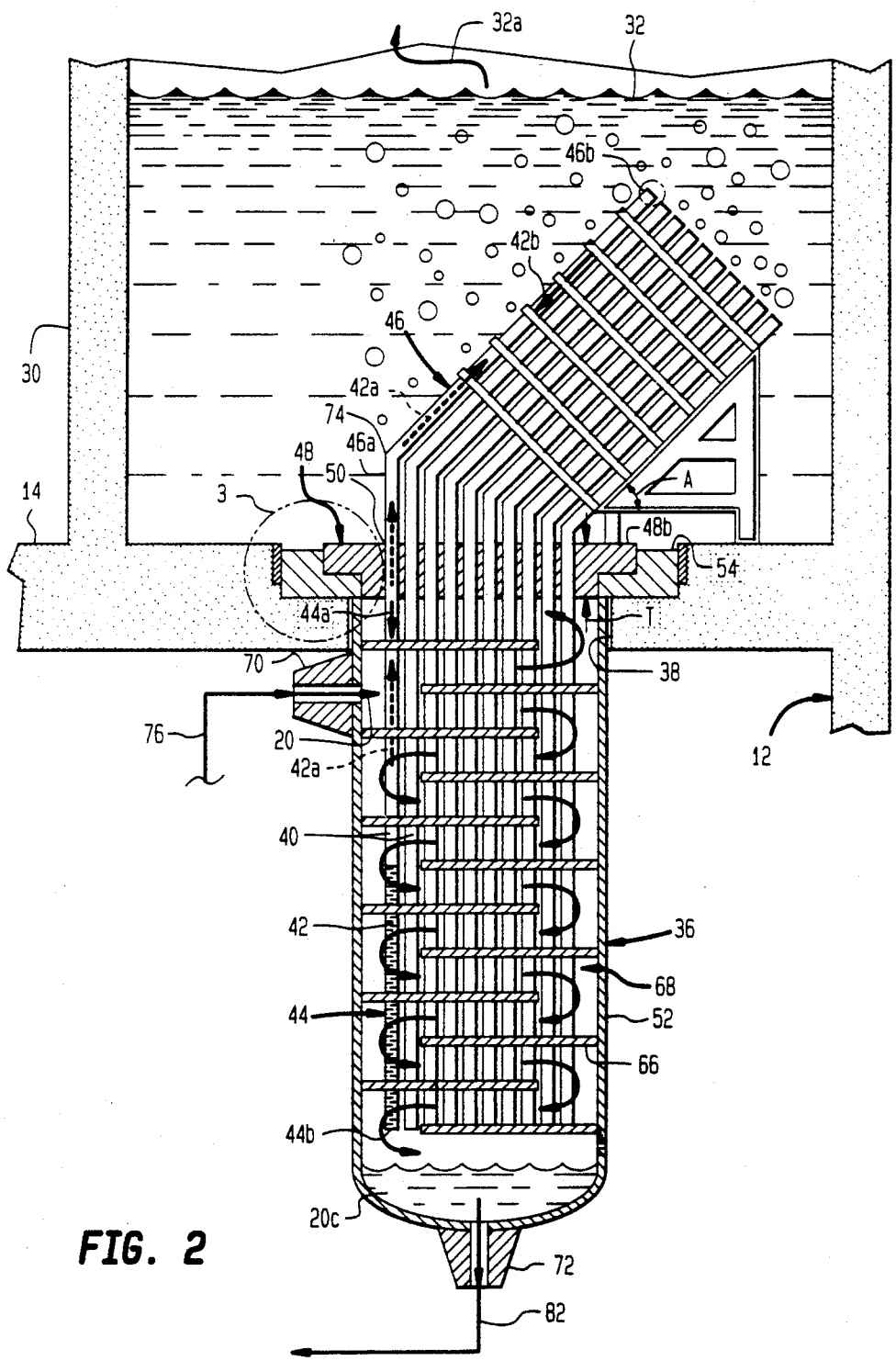
FIG. 2 is an enlarged, partly sectional, schematic elevation view of an isolation condenser including heat pipes, and an isolation pool used in the isolation cooling system illustrated in FIG. 1.
Figure 4:
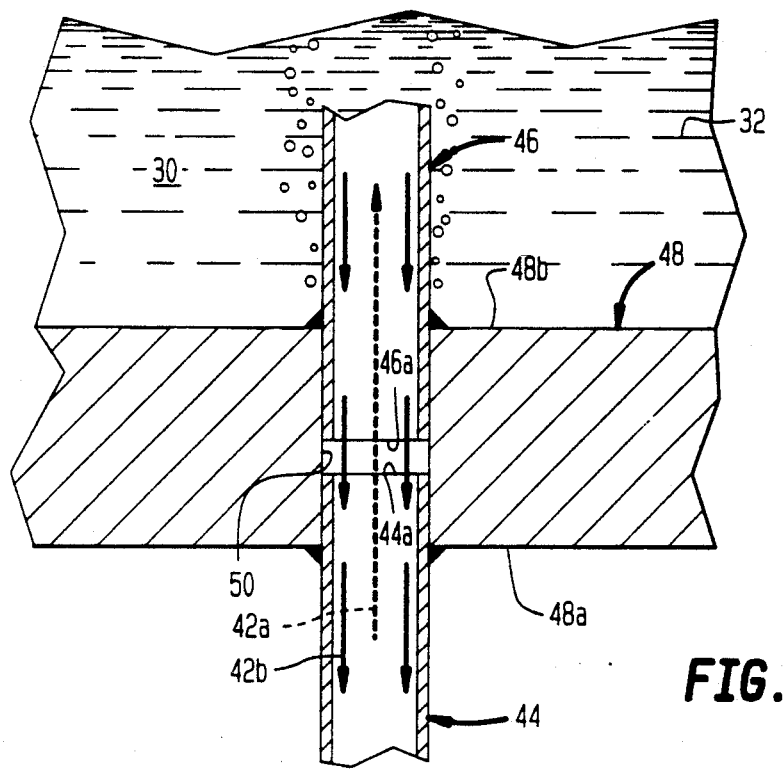
FIG. 4 is an enlarged sectional view of a joint between hot and cold tubes of the heat pipes illustrated in FIG. 2 in accordance with one embodiment.
Figure 5:
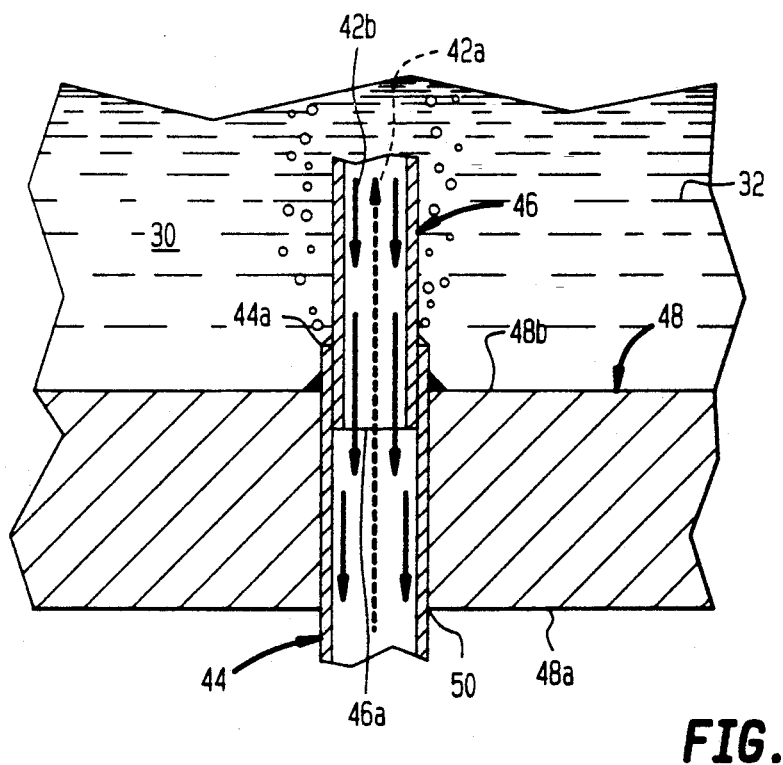
FIG. 5 is an enlarged sectional view of a joint between hot and cold tubes of the heat pipes illustrated in FIG. 2 in accordance with another embodiment.

As shown in FIG. 2, each of the hot and cold tubes 44 and 46 includes a proximal end 44a, 46a disposed adjacent to the tube sheet 48, and distal ends 44b, 46b disposed below and above, respectively, the tube sheet 48. As illustrated in FIGS. 4 and 5, two exemplary embodiments of sealingly joining the hot and cold tubes 44 and 46 to the tube sheet 48 may be used. In both embodiments, the proximal ends 44a and 46a are fixedly and sealingly joined to the tube sheet 48.

In the first embodiment illustrated in FIG. 4, the hot and cold tubes 44 and 46 are separate members with the proximal ends thereof 44a, 46a extending into the tube sheet apertures 50 from respective sides of the tube sheet 48 and are spaced from each other to form a gap therebetween. The hot and cold tubes 44 and 46 are conventionally welded to the tube sheet 48 at respective bottom and upper surfaces 48a, 48b thereof completely around each tube 44, 46. In this way, the hot and cold tubes 44 and 46 are allowed to freely expand upwardly and downwardly relative to the welds, with the gap between the two proximal ends 44a and 46a allowing for expansion therebetween. Furthermore, the isolation pool water 32 is prevented from leaking into the apertures 50 for preventing corrosion therebetween.

In the second embodiment illustrated in FIG. 5, the hot and cold tubes 44 and 46 are again separate members, with the hot tubes 44 extending upwardly completely through the tube sheet apertures 50 with the proximal ends 44a thereof being spaced above the tube sheet upper surface 48b. The hot tubes 44 are conventionally welded to the top surface 48b completely around the hot tubes 44 and below the proximal ends 44a thereof. In this way, the welds prevent leakage of the pool water 32 into the tube sheet apertures 50 for preventing corrosion therebetween. The cold tube proximal ends 46a extend downwardly inside the hot tubes 44 and below the proximal ends 44a thereof, and the cold tubes 46 are conventionally welded completely therearound to the hot tube proximal ends 44a. In this way, the welds similarly prevent the pool water 32 from leaking between the hot and cold tubes 44 and 46 at this joint for preventing corrosion therebetween. Furthermore, the respective welds allow each of the hot and cold tubes 44 and 46 to freely expand and contract upwardly and downwardly relative to the welds.

Referring again to FIG. 2, the shell 52 preferably includes a plurality of transversely alternating, vertically spaced apart flow baffles 66 having apertures therethrough for slidingly supporting the hot tubes 44. The baffles 66 may be generally semicircular and alternately extend from opposite transverse ends of the shell 52 to form a serpentine flow passage 68 for channeling the reactor steam 20 between the hot tubes 44. The shell 52 preferably includes a shell inlet 70 near the top thereof adjacent to the upper containment wall 14, and a shell outlet 72 at the bottom thereof. The reactor steam 20 enters the shell 52 through the inlet 70 and follows the serpentine flow passage 68 transversely back and forth across and between the hot tubes 44 and longitudinally downwardly to the bottom of the shell 52. Accordingly, the reactor steam 20 heats the hot tubes 44 for boiling the working fluid 42 for absorbing heat from the reactor steam 20 to condense the reactor steam 20 and form the reactor condensate 20c which collects at the bottom of the shell 52 and is dischargeable therefrom through the shell outlet 72.

The resulting working vapor 42a flows naturally upwardly from the hot tubes 44 and into the cold tubes 46 within the isolation pool 30 wherein the heat contained therein is released into the pool water 32. In order to improve the convective heat transfer capability of the cold tubes 46, they are preferably primarily inclined at the angle A as illustrated in FIG. 2 in order to more readily shed therefrom pool vapor 32a which is in the form of steam bubbles. Since the hot and cold tubes 44 and 46 are preferably arranged in an annular configuration, with the cold tubes 46 being inclined at the angle A, the cold tubes 44 have a bend 74 which is located at progressively increasing distances from the tube sheet upper surface 48b from the inside of the bends 74 to the outside of the bends 74 as shown.

Figure 6:
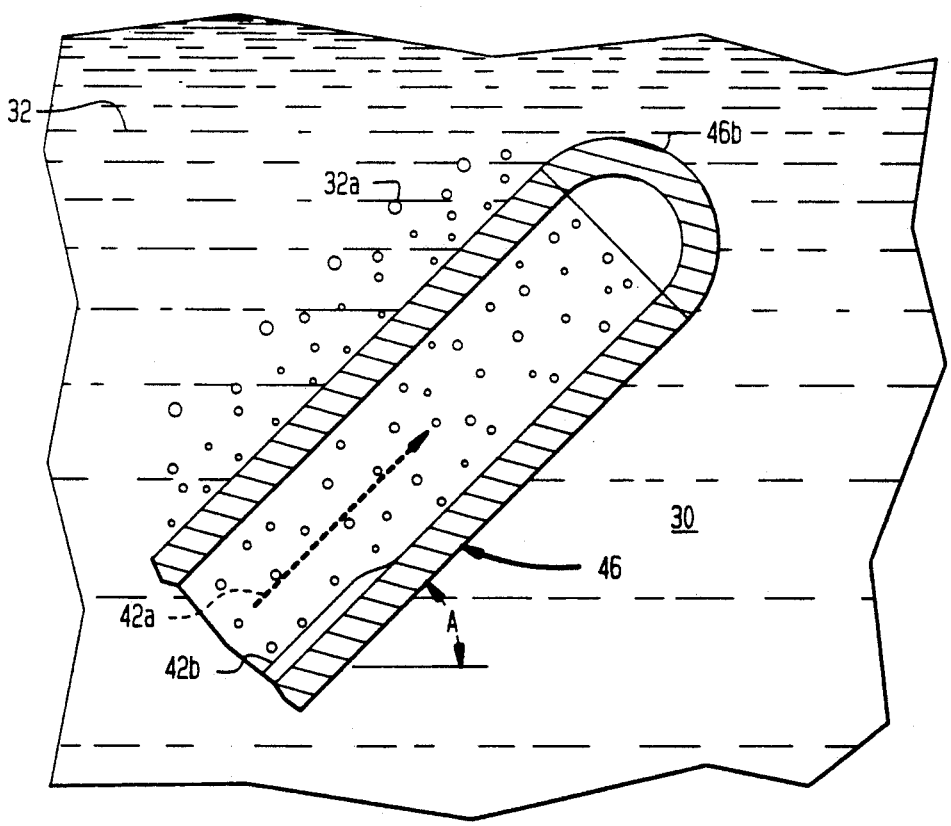
FIG. 6 is an enlarged sectional view of a distal end portion of one of the heat pipe cold tubes illustrated in FIG. 2.

As illustrated in more particularity in FIG. 6, a distal end region of one of the cold tubes 46 is illustrated to show the working vapor 42a being channeled upwardly at the inclination angle A within the cold tube 46. The relatively cold pool water 32 cools the cold tube 46 which causes the working vapor 42a to condense in the form of droplets along the inner surface of the cold tube 46 which coalesce to form the working condensate 42b which flows downwardly along the inside of the cold tube 46. The heat liberated from the condensation of the working vapor 42a heats and boils the pool water 32 adjacent to the cold tube 46 for forming the pool vapor 32a in the form of steam bubbles which collect around the outer surface of the cold tube 46. If the cold tubes 46 were oriented completely upright, the pool vapor bubbles 32a would coalesce along the outer surface of the cold tube 46 and form a boundary layer of the pool vapor 32a therearound which would increase in thickness in the vertical direction. Such boundary layer is an insulator which decreases the ability of the cold tubes 46 to dissipate heat. By inclining the cold tubes 46 at the inclination angle A, the natural buoyancy forces on the pool vapor bubbles 32a will cause such bubbles to be shed vertically from the outer surface of the cold tube 46 as they travel upwardly therealong. In this way, the insulating film of the pool vapor 32a is reduced if not eliminated for thusly improving the heat transfer capability of the cold tubes 46. The liberated pool vapor 32a rises upwardly to the surface of the isolation pool 30 as shown in FIG. 1 and is released from the pool 30 through the vent 34 to carry away the heat. In this way, the heat contained in the reactor steam 20 is dissipated into the isolation pool 30 and in turn is dissipated through the vent 34 to the atmosphere.

Referring again to FIG. 1, the isolation condenser 36 in accordance with one embodiment is joined directly to the pressure vessel 16. A conventional inlet conduit 76 is disposed in flow communication between the shell inlet 70 and a secondary outlet 78 of the pressure vessel 16 for selectively channeling the reactor steam 20 to the shell 52. The inlet conduit 76 includes a conventional, selectively openable and closeable shutoff inlet valve 80 in series flow therein. In a preferred embodiment, an outlet conduit 82 is disposed in flow communication between the shell outlet 72 and a secondary inlet 84 of the pressure vessel 16 for selectively returning the reactor condensate 20a to the pressure vessel 16. In a preferred embodiment, the outlet conduit 82 includes a conventional, selectively openable and closable shutoff outlet valve 86, and the inlet and outlet conduits 76 and 82 are disposed in parallel flow between the shell 52 and the pressure vessel 16.

The inlet and outlet valves 80 and 86 are preferably normally open valves, which may be conventionally spring biased open so that upon failure of power thereto these valves are open for providing passive isolation cooling of the reactor steam 20 by the isolation condenser 36. During normal operation of the reactor core 18, power is conventionally provided to the inlet and outlet valves 80 and 86 so that they are both closed for isolating the condenser 36 from the pressure vessel 16. This is one improvement over a conventional isolation condenser including a conventional heat exchanger which requires normally closed isolation valves which must be closed in the event of a power failure to ensure that any failure within the heat exchanger thereof does not release radioactive steam from the isolation pool thereof to the atmosphere. Since the heat pipes 40 provide a redundant barrier to prevent the radioactive reactor steam 20 from leaking into the isolation pool 30, the inlet and outlet valves 80 and 86 may be normally open for providing a more passive isolation cooling system with reduced risk of radioactivity release to the atmosphere.

In an alternate embodiment of the isolation cooling system 10 illustrated in FIG. 1, the secondary inlet 84 and outlet valve 86 may be eliminated, with the outlet conduit 82 being disposed in direct flow communication with the inlet conduit 76 between the inlet valve 80 and the shell inlet 70 as shown in phantom line designated 82a. In this way, the single secondary outlet 78 and inlet valve 80 may be used for controlling operation of the condenser 36, with the reactor steam 20 being channeled upwardly through the inlet line 76 to the shell inlet 70 and the reactor condensate 20c flowing downwardly from the shell outlet 72 and also through the inlet valve 80 and secondary outlet 78 into the pressure vessel 16. The inlet conduit 76 in such an embodiment will channel both the reactor steam 20 in one direction and the reactor condensate 20c in an opposite direction through the same conduit.

However, in order to prevent the reactor steam 20 from flowing upstream against the reactor condensate 20c in the outlet conduit 82a, the outlet conduit 82a preferably includes a conventional U-shaped steam trap 82b which may be alternatively known as a manonometer-type seal. The steam trap 82b will fill with the reactor condensate 20c and therefore prevent the reactor steam 20 from flowing upstream therethrough and into the shell 52 through the shell outlet 72. However, the reactor condensate 20c upon filling the steam trap 82b will be allowed to flow therethrough to continue its passage through the outlet conduit 82a and into the pressure vessel 16. In this exemplary embodiment, the isolation condenser 36 is elevated above the reactor core 18 and the reactor water 20a therein so that gravity is used to return the reactor condensate 20c to the pressure vessel 16.

Although the heat pipes 40 described above for this preferred embodiment of the present invention utilize gravity to return the working condensate 42b back to the hot tubes 44, the heat pipes 40 in alternate embodiments of the invention could also be conventional capillary-type heat pipes which rely on capillary action of the working fluid 42 instead of gravity for returning the working condensate 42b from the cold tubes 46 to the hot tubes 44.

In yet another alternate embodiment, the secondary outlet 78 and inlet valve 80 may be eliminated, with the inlet conduit 76 having an open inlet end 76a as shown in phantom in FIG. 1 disposed in direct communication with the interior of the containment building 12 for directly channelling to the shell inlet 70 any reactor steam 20 which might escape into the building 12 by accident.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

We claim:

1. A reactor steam isolation cooling system comprising:
   a containment building having a containment wall;
   a reactor pressure vessel disposed inside said containment building and including a nuclear reactor core therein operable for generating reactor steam;
   an isolation pool disposed outside said containment building and adjacent to said containment wall and containing pool water, said isolation pool including a vent disposed in flow communication with an atmosphere outside said containment building;
   an isolation condenser including:
      a plurality of parallel heat pipes each containing a heat transfer working liquid, each of said heat pipes including a hot tube collectively defining an evaporator assembly for heating said working liquid therein to form a working vapor, and a cold tube collectively defining a condenser assembly for cooling said working vapor to form a working condensate for return to said hot tube;
      a tube sheet disposed between said hot and cold tubes and through which said heat pipes are disposed in sealing contact therewith; and
      said tube sheet being disposed sealingly through said containment wall with said condenser assembly being disposed outside said containment building and inside said isolation pool, and said evaporator assembly being disposed inside said containment building; and
   means for selectively channeling said reactor steam from said pressure vessel between said hot tubes of said evaporator assembly for removing heat therefrom to form reactor condensate.

2. A system according to claim 1 further comprising:
   a shell surrounding said evaporator assembly inside said containment building and sealingly joined to said tube sheet, said shell including a shell inlet for receiving said reactor steam, and a shell outlet; and
   a plurality of alternating, spaced apart baffles slidingly joined to said hot tubes to form a serpentine flow passage for channeling said reactor steam from said shell inlet transversely back and forth across said hot tubes for absorbing heat therefrom to condense said reactor steam and form said reactor condensate dischargeable from said shell outlet.

3. A system according to claim 2 wherein said hot tubes are disposed vertically inside said containment building, and said cold tubes are primarily inclined inside said isolation pool.

4. A system according to claim 3 further comprising:
   an inlet conduit disposed in flow communication between said pressure vessel and said shell inlet for selectively channeling said reactor steam to said shell, and including a selectively openable and closable shutoff inlet valve; and
   an outlet conduit disposed in flow communication between said shell outlet and said pressure vessel for returning said reactor condensate to said pressure vessel.

5. A system according to claim 4 wherein said inlet valve is normally open so that upon failure of power thereto said inlet valve is open, and upon providing power thereto said inlet valve is closed.

6. A system according to claim 5 wherein said outlet conduit includes a selectively openable and closable shutoff outlet valve; and said inlet and outlet conduits are disposed in parallel between said pressure vessel and said shell.

7. A system according to claim 5 wherein:
   said outlet conduit includes a steam trap for preventing flow of said reactor steam therethrough while allowing flow of said reactor condensate therethrough; and
   said outlet conduit is disposed in flow communication with said inlet conduit between said inlet valve and said shell inlet.

8. A system according to claim 2 wherein:
   said tube sheet has a plurality of apertures extending therethrough;
   each of said hot and cold tubes has a proximal end and a distal end; and
   said proximal ends of said hot and cold tubes are fixedly and sealingly joined to said tube sheet.

9. A system according to claim 8 wherein said hot and cold tube proximal ends extend into said tube sheet apertures and are spaced from each other, and said hot and cold tubes are welded to said tube sheet at respective surfaces thereof.

10. A system according to claim 8 wherein:
    said hot tubes extend upwardly through said tube sheet apertures with said proximal ends thereof being spaced above a top surface of said tube sheet, and said hot tubes are welded to said top surface of said tube sheet; and
    said cold tube proximal ends extend downwardly inside said hot tubes, and said cold tubes are welded to said hot tube proximal ends.

* * * * *